Oct. 4, 1932.  H. D. BENNETT  1,880,398
WEIGHING SCALE
Filed Dec. 4, 1929    3 Sheets-Sheet 1
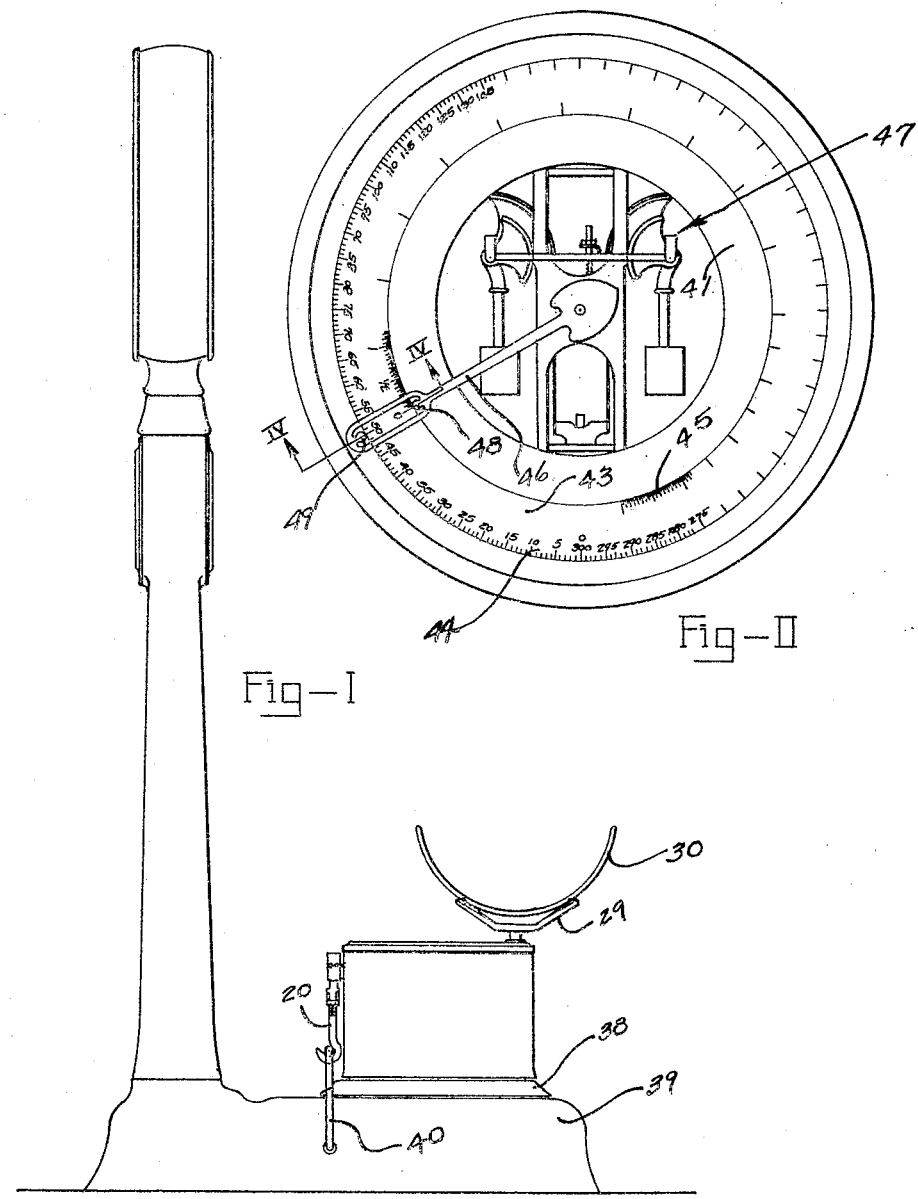
INVENTOR
HUBERT D. BENNETT
ATTORNEY

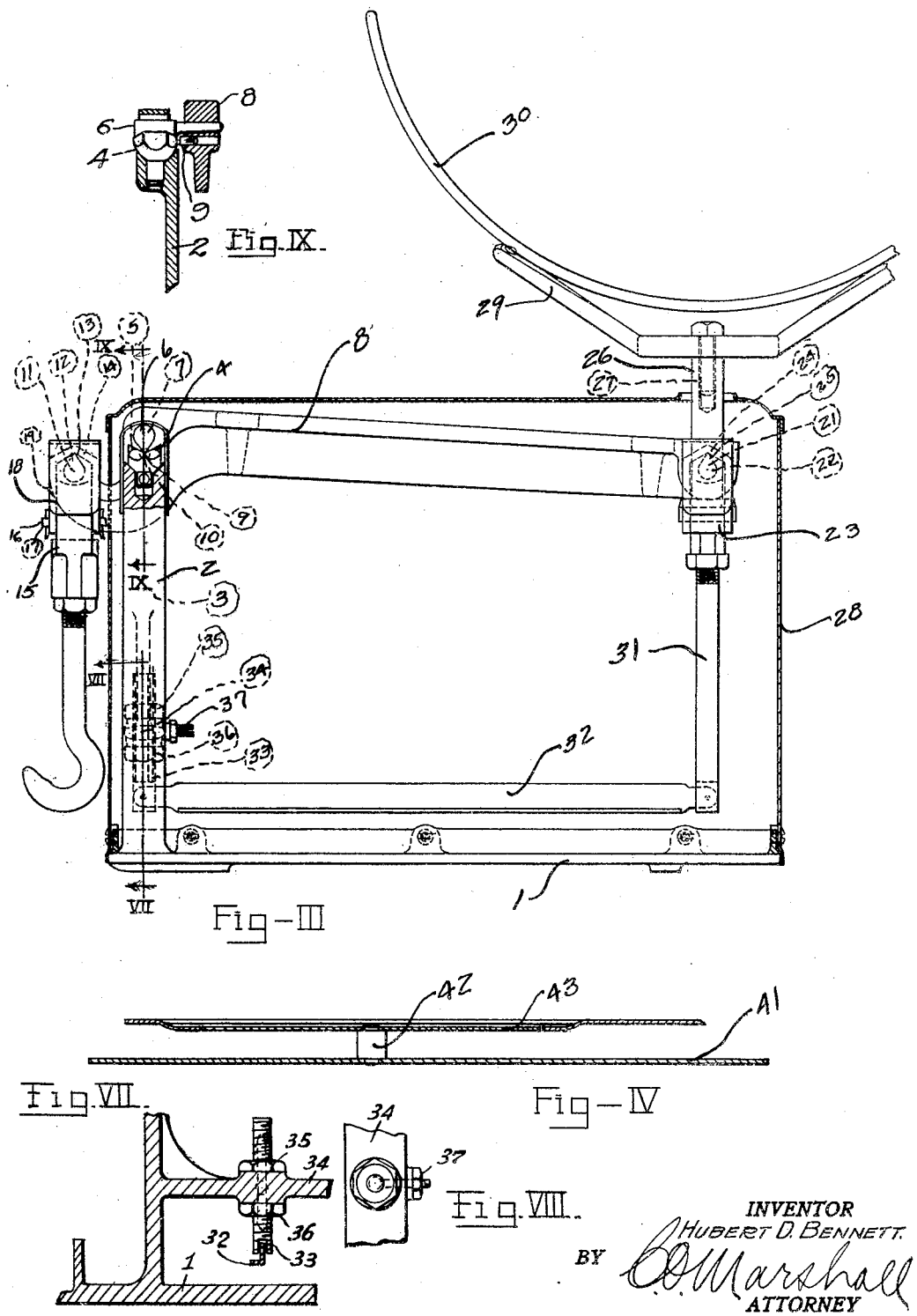

Oct. 4, 1932. H. D. BENNETT 1,880,398
WEIGHING SCALE
Filed Dec. 4, 1929 3 Sheets-Sheet 3
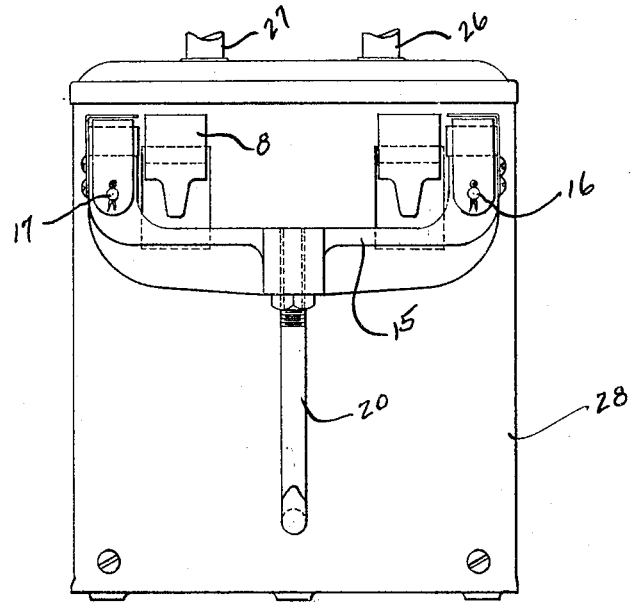
Fig-V
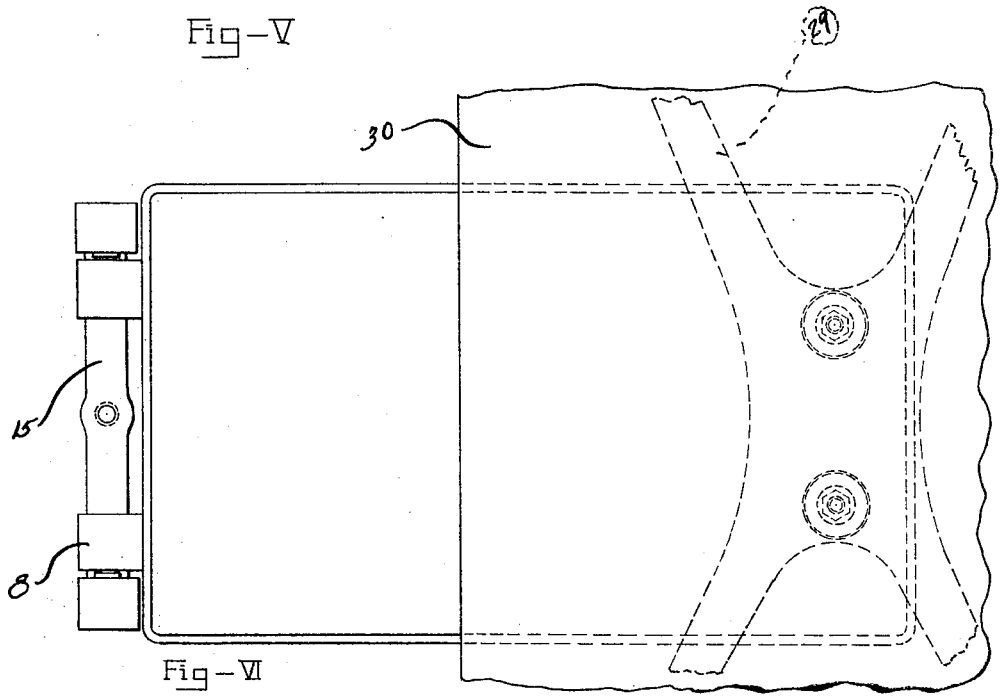
Fig-VI
INVENTOR
HUBERT D. BENNETT
BY Marshall
ATTORNEY Patented Oct. 4, 1932

1,880,398

UNITED STATES PATENT OFFICE

HUBERT D. BENNETT, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed December 4, 1929. Serial No. 411,410.

This invention relates to improvements in weighing scales and in particular to weighing scales which are adapted to automatically indicate the weight of persons. Scales of this type generally have a capacity of 300 pounds which are indicated pound by pound by a relatively movable chart and indicator. These scales are well adapted to indicate the weight of adults and older children, but they are not adapted to weigh babies and infants, for several reasons. One of these is the fact that the scales for weighing adults are not provided with suitable means for supporting babies while being weighed; another is that the weight of babies must be determined to ounces and fractions thereof in order to be of any value as a guide for their health and well being.

The principal object of my invention is, therefore, the provision of means whereby babies and infants may be weighed on a scale intended for adults.

Another object is the provision of means whereby any automatic scale may be equipped to weigh babies.

Still another object is the provision of means whereby suitable supporting means may be attached to a scale intended to weigh adults.

A still further object is the provision of means whereby the baby supporting means may be very compactly constructed.

A still further object is the provision of means whereby said baby supporting means may be attached to and removed from a weighing machine which is adapted to weigh adults.

Other objects and advantages will be apparent from the following description wherein reference is had to the accompanying drawings and wherein similar reference numerals designate similar parts throughout the several views.

In the drawings:—

Figure I is a side elevational view of a person weighing scale to which the baby supporting means of my invention are shown attached.

Figure II is an enlarged front elevational view of the counterbalancing and indicating means of the weighing scale.

Figure III is an enlarged side elevational view, partly in section and a part broken away, of the baby supporting means of my invention.

Figure IV is a section substantially along the line IV—IV of Figure II.

Figure V is an end elevational view of the baby supporting means, showing the means for attaching it to the person weighing scale; and Figure VI is a plan view, with parts broken away, of the device.

Figure VII is an enlarged sectional fragmentary view taken substantially on the line VII—VII of Figure III.

Figure VIII is a fragmentary plan view of part of the device shown in Figure VII.

Figure IX is an enlarged fragmentary sectional view taken substantially on the line IX—IX of Figure III.

Referring to the drawings in detail, the device as shown in Figure III consists of a base plate 1 which is preferably a rigid iron casting. Integral with the base plate 1 are two upwardly extending posts 2 and 3, which carry on their upper extremities, bearings 4 and 5, in which the fulcrum pivots 6 and 7 are mounted. These pivots are secured in a lever 8 and extend laterally therefrom. The bearings 4 and 5 are so made that pointed, hardened portions project inwardly and are adapted to contact small, hardened, steel inserts 9 and 10, which are secured in the lever 8 to prevent lateral displacement of the lever, thus assuring the absence of friction at this point of the device. The lever 8 is also provided with pivots 11 and 12, which also extend laterally from the lever 8. These pivots are in spaced relation with the pivots 6 and 7 and support by means of the bearing loops 13 and 14 a connecting bar 15. The bearing loops 13 and 14 are pivotally attached to the bar 15 by means of the pins 16 and 17. Thrust plates 18 and 19 are secured to the connecting bar 15 to prevent lateral displacement. Midway between the bearing loops 13 and 14, adjustably secured in the connecting bar 15, is a depending hook 20. The opposite end of the lever 8 is also provided with laterally extending pivots 21 and 22. From these pivots a connecting bar 23 is similarly supported as the connecting bar 15 by means of bearing loops 24 and 25. These loops are attached to the connecting bar 23 by means of pins. The connecting bar 23 is provided with two upwardly extending studs 26 and 27. These studs extend between the two arms of the lever 8 and through apertures provided in the casing 28, which covers the interior mechanism and is fastened to the bottom plate 1. Fastened to the top of the studs 26 and 27 is a light cast spider 29, which is adapted to support a cradle 30, which serves to support the baby while being weighed.

A check link arrangement which serves to maintain the condition of level of the supporting means consists of a check link stem 31, which is fixed in the connecting bar 23. The lower end of the stem 31 is pivotally connected to one end of a check link 32, the other end of which is pivotally secured to an adjustable stud 33, which is stationed in a horizontal bar 34 which connects the two upright posts 2 and 3. The stud 33 is threaded for a part of its length and is provided with adjusting and locking nuts 35 and 36. It is also provided with a kerf which extends longitudinally. A suitably pointed screw 37, which is threaded in an aperture of the connecting bar 34, extends into the kerf and prevents rotation of the stud 33 around its longitudinal axis when it is being adjusted by means of the adjusting and locking nuts 35 and 36 to obtain a true parallelogram of the lever and check link.

The specific scale shown in connection with my device is not per se a part of this invention, and I will describe it only in such detail as is necessary in order that the operation of the baby weighing attachment embodying my invention may be clearly understood. When it is desired to weigh a baby, the device is placed on the platform 38, which is mounted on the weighing levers (not shown) located within the base 39 of the scale. The hook 20 of the attachment is then brought into engagement with a yoke 40, which is pivoted to the scale base 39. This yoke may be attached in a more permanent manner.

As one of the objects of the device is the means for indicating the weight of babies in ounces or fractions thereof, I have provided an improved indicating means. In place of the usual indicating chart which is graduated in pounds, I have provided a blank plate 41. Secured thereto and spaced therefrom is an annular flat ring 43. The ring 43 is provided with two sets of graduations and designating numerals 44 and 45. The row 44 is graduated by pounds and fractions of pounds, and is intended to be used with the person weighing scale proper, while the row of indicia 45 is intended to be used in connection with the baby weighing attachment of my invention, and the graduations thereon represent ounces and fractions thereof. The indicator 46, which is operatively connected with the pendulum counterbalancing mechanism 47 of the weighing scale, is provided with two indicating tabs 48 and 49, which are bent downwardly so that they lie in the plane of the annular ring 43. The index lines marked on the tabs 48 and 49 now form continuations of the graduations 44 and 45 and thus obviate any possibility of error due to parallax.

When a baby is placed in the cradle 30, its weight presses downwardly on the lever 8. The lever being fulcrumed on the posts 2 and 3, its movement is resisted by the yoke 40 to which the connecting bar supported by the pivots 11 and 12 is fastened by means of the hook 20. The pressure of the weight of the baby is thus transmitted to the platform of the scale and is counterbalanced by the pendulum mechanism 47. The lever 8 has a multiplication of 10, so that a baby weighing 15 pounds exerts a force of 150 pounds on the platform and the counterbalancing action of the scale is the same as though a person weighing 150 pounds were standing on the platform. The row of indicia 45, which is to be used in connection with the baby weighing attachment, does not start at the same point as the row of indicia intended to be used with the weighing scale proper, as the blank portion of the chart represents the weight of the device which is counterbalanced by the pendulum mechanism 47. However, as the indicia row 45 extends practically in a complete circle on the chart, it is obvious that the graduations can be marked in ounces and fractions thereof.

It will be seen that all the objects of my invention are readily and efficiently attained. The device is compact and may be placed on any person weighing scale by a few simple changes and additions.

Having described my invention, I claim:

1. In a person weighing scale, in combination, load-receiving means and load-counterbalancing and indicating mechanism adapted for automatically weighing adults, said indicating mechanism including a chart bearing indicia corresponding both to weights of adults and weights of infants, an attachment for connection to said weighing and indicating mechanism, said attachment having a load-receiver adapted to support infants, and means whereby said load-counterbalancing and indicating mechanism is automatically placed in condition for infant weighing by the attaching of said attachment.

2. In a person weighing scale, in combination, load-receiving and load-counterbalancing and indicating mechanism adapted for weighing adults, said indicating mechanism including a chart having a series of indicia corresponding to weights of adults, said chart also having a series of indicia corresponding to weights of infants, an attachment for connection to said weighing and indicating mechanism having a load-receiver adapted to support infants, and means whereby said load-counterbalancing and indicating mechanism are automatically placed in condition for infant weighing by the attaching of said attachment.

3. In a person weighing scale, in combination, load-receiving and load-counterbalancing and indicating mechanism adapted for weighing adults, said indicating mechanism including a chart having a series of indicia corresponding to weights of adults and an index adapted to co-operate with said series of adult indicia, a series of indicia corresponding to weights of infants, an index adapted to cooperate with said series of infant indicia, an attachment for connection to said weighing and indicating mechanism having a load-receiver adapted to support infants, and means whereby upon the attaching of said attachment said load-counterbalancing mechanism is automatically placed in condition for infant weighing and the last-mentioned index is brought into co-operative relation with said series of infant indicia.

4. In a person weighing scale, in combination, a load-receiver and load-counterbalancing and indicating mechanism adapted for weighing adults, said indicating mechanism including a chart having a series of indicia corresponding to weights of adults and an indicator adapted to co-operate therewith, a series of indicia corresponding to weights of infants, the zero indicium of the series corresponding to weights of infants being advanced with respect to the zero indicium of the series corresponding to weights of adults, an attachment for connection to said weighing and indicating mechanism having a load-receiver adapted to support infants, and means whereby upon the attaching of said attachment said load counterbalancing mechanism is automatically placed in condition for infant weighing and said indicator is automatically moved into co-operative relation with said series of indicia corresponding to weights of infants.

5. In a person weighing scale, in combination, a load-receiving platform, load-counterbalancing and indicating mechanism adapted for weighing adults on said platform, an attachment adapted to be supported upon said platform, said attachment having a load-receiver adapted to support infants, and means whereby the attaching of said attachment in position on said platform automatically places said load-counterbalancing mechanism in condition for weighing infants.

6. In a person weighing scale, in combination, a load-receiving platform, load-counterbalancing and indicating mechanism adapted for weighing adults on said platform, said indicating mechanism including a series of indicia corresponding to weights of adults and a co-operating index and a series of indicia corresponding to weights of infants and a co-operating index, an attachment adapted to be supported upon said platform, said attachment having a load-receiver for supporting infants, and means whereby the attaching of said attachment in position on said platform automatically places said load-counterbalancing mechanism in condition for weighing infants and moves said series of infant indicia and its co-operating index into position for indicating infant weights.

7. In a person weighing scale, in combination, a frame, load-counterbalancing and indicating mechanism supported thereby, a load-receiving platform, an attachment including a load-receiver adapted to support infants, means for connecting said attachment to said frame, and means whereby supporting said attachment on said frame and connecting said attachment to said frame automatically places said load-counterbalancing and indicating mechanism in condition for weighing infants.

HUBERT D. BENNETT.